Patented Nov. 27, 1928.

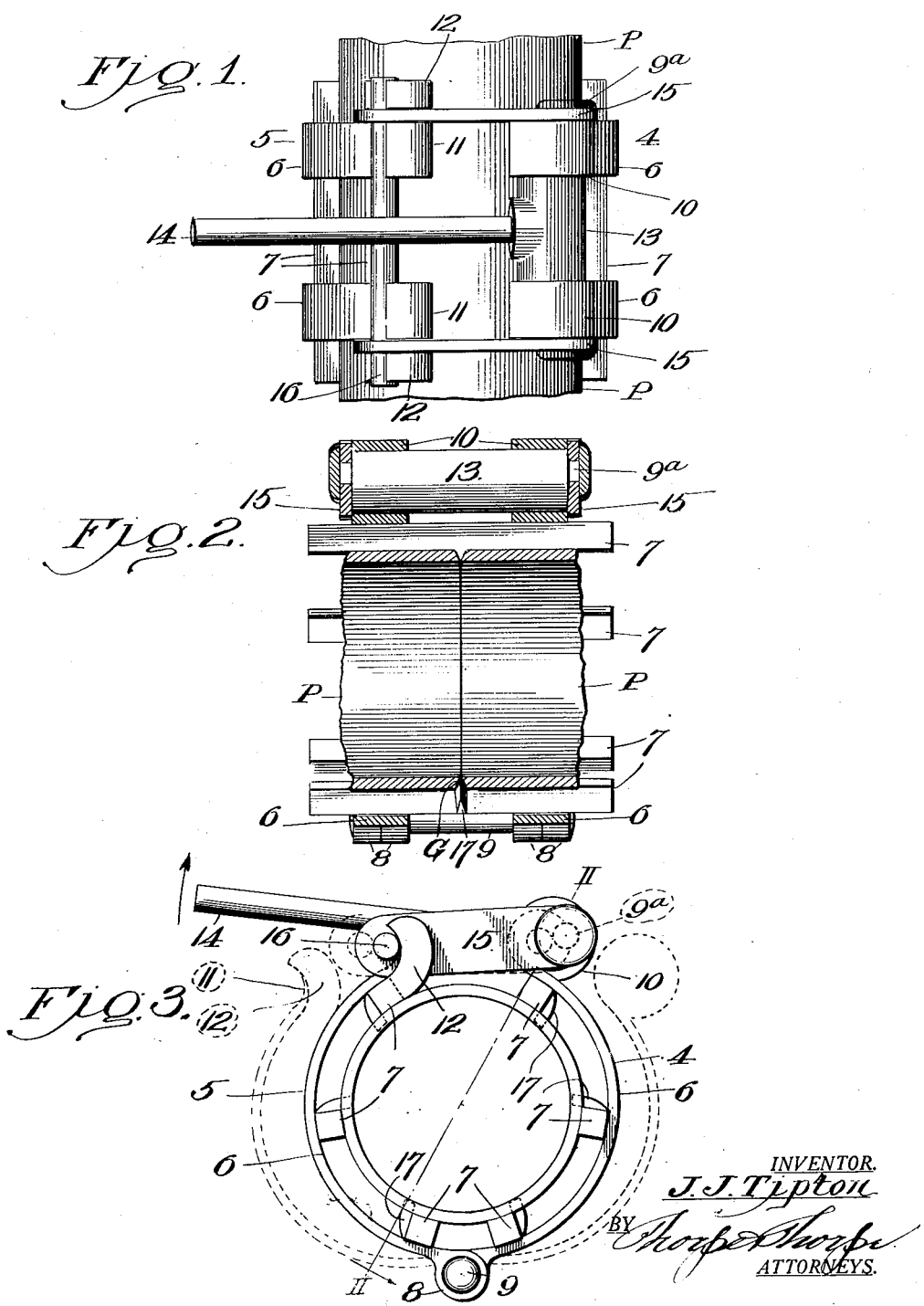

1,693,064

UNITED STATES PATENT OFFICE.

JOHN J. TIPTON, OF PAMPA, TEXAS.

PIPE CLAMP.

Application filed September 8, 1927. Serial No. 218,234.

This invention relates to pipe clamps, and more especially to clamps for lining up sections of pipe and holding them alined until they can be "tacked" together by welding operations, preliminary to effecting their complete and permanent union by welding in the conventional or any preferred manner.

In the oil and gas fields it was the custom for a long period to provide pipe lines by screwing pipe sections together directly or by means of a threaded coupling. Of late the method of connecting pipe sections together by butt welding them has grown rapidly, as by such method better provision is made against leakage and the cost is materially reduced. In practice, the pipe sections are initially placed on "skids" or temporary supports for convenience of the welding operation. If inspection discloses that the work is improperly performed, the weld is cut and rewelded, and sometimes sections of pipe must be discarded. It is also common to find pipe sections which are not properly round through warpage or other cause, and if such warped sections are welded together or to proper sections, an imperfect or "high" or "low" weld results, and as far as my knowledge extends there have been no clamps heretofore, by which sections can be invariably brought to proper alined relation regardless of whether they are truly round or more or less warped.

Accordingly, it is a desideratum to provide means to not only properly line-up and hold pipe sections in place, but to insure uniform spacing between them and to bring warped sections to properly rounded form, and it is my prime object to accomplish such result by a relatively inexpensive clamp which can be handled by cheap labor and which possesses the properties of strength and durability and is of relatively light weight for ease and convenience of handling.

With the object named in view, the invention consists in certain novel and useful features of construction and combinations of parts as hereinafter described and claimed; and in order that it may be fully understood, reference is to be had to the accompanying drawing, in which:

Figure 1 is a plan view of abutting sections of pipe, and also shows applied to abutting ends of the pipe sections, a clamp embodying the invention.

Figure 2 is a longitudinal section taken on the line II—II of Figure 3.

Figure 3 is an end view of the pipe line encompassed by the clamp as in Figure 1, the clamp being shown open in dotted lines.

In the said drawing, P indicates a pair of pipe sections fitting end to end and, as customary, bevelled inwardly at their ends to provide a V-shaped groove G; said pipe sections resting on an elevated support or skid, not shown, but extending usually along the line of a trench provided for the reception of the pipeline. Pipelines of the kind under consideration vary in size and usually run from about two inches to twenty inches in diameter, and are designed for the conduct of oil or gas from the points of supply to points sometimes hundreds of miles distant, where consumption takes place.

As hereinbefore mentioned, the modern method of connecting pipe sections into a continuous pipeline, is by welding the abutting sections together, and it is important that the line-up be accurate so that the welds shall be strong entirely around the pipe joint and leakproof.

Ordinarily a large number of pipe sections are welded together to form a single unit, which at the proper time is lowered into the trench and welded or otherwise united to a corresponding unit.

Heretofore there has been no clamp or device provided which would invariably properly line-up the pipe sections, especially if the sections were relatively more or less warped or distorted as is frequently the case, and I have provided a clamp which properly lines up sections of pipe regardless of their condition and which also insures proper spacing abutting pipe ends to allow for expansion of the metal on the application of heat and thus avoid buckles or overlaps at the weld, such clamp being constructed as follows: 4 and 5 indicate two approximately semi-circular members of skeleton construction, each comprising a plurality of spaced curved bars 6 connected at their inner sides by straight bars 7 spaced apart at suitable intervals so that openings are provided between the curved and straight bars of said members, the straight bars being rigidly secured, preferably by welding, to the curved bars. At one end of each curved bar, a hinge ear 8 is formed, those of one member being overlapped by those of the other, and extending through and permanently hinging the ears together is a pivot pin 9.

The opposite or free ends of the curved bars of one member terminate in hinge loops or eyes 10, and the corresponding ends of the curved bars of the other member terminate in out-turned hooks 11, these hooks being interposed between and spaced from corresponding hooks 12 formed on the extremities of the adjacent straight bar 7 of the same member.

A cylindrical post 13 is journaled in the eyes or loops 10 and is provided with a handle 14 by which it may be turned, and eccentrically pivoted at 9ª to the ends of said post is a latch member composed of a pair of drawbars 15, capable of readily swinging into or out of the spaces provided between the hooks 11 and 12 at the free end of the other member, and a connecting bar or rod 16 which projects beyond the bars 15, so that when said drawbars enter said spaces, the bar or rod shall be capable of simultaneously engaging all of the hooks. When thus engaged, the turning of the handle in the proper direction imparts clamping or unclamping action to the members. To insure uniform spacing of the pipe sections, and exact alinement thereof, the straight bars of the two members of the clamp are provided about midway their length with inwardly-projecting tapered lugs 17, designed to engage the juxtaposed bevelled ends of the sections.

When a pair of pipe sections are about to be joined, the clamp is placed in open position with its hinged side down, on the skid. The two pipe sections are then placed with their adjacent ends upon and within the open clamp in approximate alinement and with their ends about in contact. The clamp members are then swung up against the sides of the pipes, and the latch frame is operated to bridge the space between the free ends of the members and extend through the spaces between the hooks and cause the rod to engage the hooks, the pipes and clamp being so relatively arranged that in this operation the tapered lugs will enter the groove formed by and between abutting pipes at the bevelled ends thereof. The operator next manipulates the lever to perform the clamping operation, it being of course understood that the clamp will be so proportioned relatively to the pipe sections that the latch member can be readily disposed as hereinbefore explained. The operation of the lever therefore has merely to perfect the alinement of the pipe section by applying uniform clamping pressure thereon, and in this action the lugs engage the bevelled ends of the pipe sections and thus serve to push them slightly apart to insure uniform spacing all around, this action continuing until the lever has been swung past center so that it shall have no tendency to reopen under the resistance offered by the clamped pipe sections—in fact after the lever passes over center, the resistance of the pipe sections tending to open the clamp, insures the retention of the lever in operative or locked position.

It will also be understood that the action of the clamp is not only to properly space and aline adjacent pipe sections but, through the compressive action of bars 7, to bring back distorted or warped sections to properly rounded condition and thus insure that the external and internal surfaces of the pipe sections are in concentric relation.

With the sections clamped as explained, the operator or operators proceed to "tack" the sections together at a number of points, this "tacking" being accomplished by welding the sections together at their abutting ends in any suitable or proper manner, the "tacking" being readily accomplished through the openings provided in the members, as hereinbefore explained.

After two or any required number of sections have been properly alined and "tacked" together, the clamp at each joint is removed, and then the operators proceed to complete the welding operation by the conventional or any other method, the pipe sections being rolled on the skid as the welding operation proceeds, so that said sections may be welded together completely around the joint.

It has been found in actual practice in the oil fields that these pipe clamps facilitate the operation of and insure better and more uniform welding of pipe sections than any means heretofore employed, and that the operation of such clamps has materially reduced the labor and other costs, and that the necessity for cutting welds and wasting piping has been practically eliminated. It is to be understood that the lugs are of such thickness as to space pipe ends in proportion to the degree such pipe ends have been found to expand upon the application of heat. Most defective joints are due to too close abutment between pipe ends, so that upon the application of the welding heat the joints buckle, warp or overlap.

From the above description it will be apparent that I have produced a pipe clamp possessing the features of advantage set forth as desirable in the statement of the object of the invention, and while I have illustrated and described the preferred embodiment, it is to be understood that it is susceptible of modification in various particulars without departing from the principle of construction and mode of operation involved or from the spirit and scope of the appended claims.

I claim:

1. A pipe clamp comprising a pair of oppositely bowed members hingedly connected together at one side and adapted for engaging opposite sides of a pair of alined pipes, and provided at an intermediate point of the length of said members with inwardly-projecting lugs to enter between and space the adjacent ends of the pipes, and means for effecting closing movement of the clamp members.

2. A pipe clamp comprising a pair of oppositely bowed members hingedly connected together at one side and adapted for engaging opposite sides of a pair of alined pipes, and provided at an intermediate point of the length of said members with inwardly-projecting lugs to enter between and space the adjacent ends of the pipes, a lever pivoted to the free end of one of the clamp members, and a latch member eccentrically pivoted to the lever and adapted for engagement with the free end of the other member and endwise movement under the operation of said lever.

3. A pipe clamp comprising two skeleton approximately semi-circular members hinged together at one side and provided intermediate the length of the members, with inwardly-projecting pipe-spacing lugs to enter between and space the adjacent ends of abutting pipe, a latch for detachably connecting the opposite or free sides of the members, and a lever concentrically connected to the latch member and pivoted to one of the clamp members and adapted for pulling or pushing and respectively causing the latch member to effect approaching or permit receding movement of the free ends of the clamp members.

4. A pipe clamp comprising a pair of oppositely bowed members consisting of crossed curved and straight bars, the latter being disposed at the inner side of and bearing a rigid relation to the curved bars of the respective members; the curved bars of the members being hinged together at one side of the clamp and their opposite extremities respectively provided with hinge loops and hooks, a lever pivoted in the hinge loops, and a latch comprising a pair of bars eccentrically pivoted to the pivot of the lever and provided with a connecting bar at their opposite ends paralleling the pivot of the lever, for engagement with said hooks, said latch member under the operation of the lever tending to impart clamping movement to the bowed members or permit unclamping movement thereof.

5. A pipe clamp, comprising two oppositely bowed members, each composed of a pair of spaced curved bars, the corresponding ends of the bars of the two members being hinged together, and their opposite ends terminating respectively in alined hinge loops and alined out-turned hooks, spaced longitudinal bars bridging the space between and rigidly secured to and projecting beyond the outer sides of the curved bars of the respective members and provided at intermediate points with inwardly-projecting bevelled lugs for fitting between and spacing adjacent ends of alined pipes within the clamp; the longitudinal bar adjacent the out-turned hooks of one of the members being provided outward of the corresponding curved bars, with out-turned hooks spaced from but alined with the first-named out-turned hooks, a pivot post journaled in the hinge loops at the free end of the other member and provided with a lever, a pair of bars fitting against the outer ends of said post and eccentrically pivoted thereto and adapted to extend through the respective spaces between adjacent hooks of the curved bars and said longitudinal bar, and a rod rigidly connecting said eccentrically pivoted bars and adapted to engage the said hooks for imparting approaching movement to the members when the lever is properly operated.

6. A pipe clamp comprising a device to encircle adjacent ends of a pair of pipes, a clamp to effect contraction of said device on the pipes, and pipe spacing lugs carried by said device and adapted to enter between and space the adjacent ends of the pipes.

7. A pipe clamp comprising a device to encircle adjacent ends of a pair of pipes placed in longitudinal alinement, means to effect clamping of said device on the pipes, and pipe spacing lugs carried by said device and adapted to enter between and space the adjacent ends of the pipes.

In testimony whereof I affix my signature.

JOHN J. TIPTON.